UNITED STATES PATENT OFFICE.

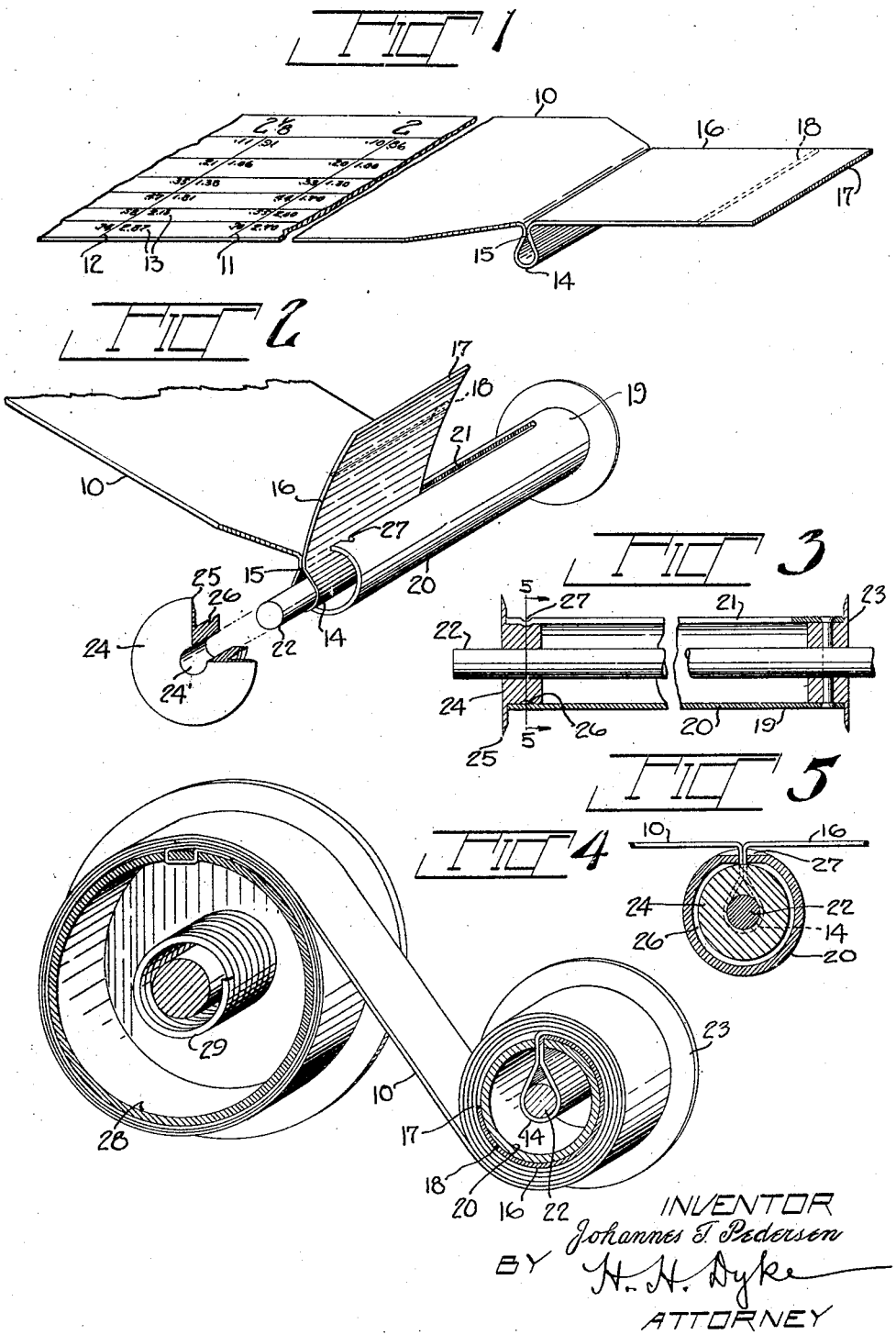

JOHANNES T. PEDERSEN, OF FLUSHING, NEW YORK, ASSIGNOR, BY MESNE ASSIGNMENTS, TO THE MEASUREGRAPH COMPANY, A CORPORATION OF MISSOURI.

FABRIC-MEASURING CHART AND ROLLER THEREFOR.

1,418,162.     Specification of Letters Patent.    Patented May 30, 1922.

Application filed December 27, 1919. Serial No. 347,867.

*To all whom it may concern:*

Be it known that I, JOHANNES T. PEDERSEN, a citizen of the United States, and a resident of Flushing, county of Queens, and State of New York, have invented certain new and useful Improvements in Fabric-Measuring Charts and Rollers Therefor, of which the following is a specification.

My invention relates to a fabric measuring and cost computing machine and especially to machines of this type in which a chart is employed carrying computed figures or indications corresponding to different price rates. The machine also includes a measuring roller which is actuated by the fabric being measured as it passes through the machine, the movement of this measuring roller being imparted to the chart; in this way the computed figures on the chart are brought successively into view at the reading point or window of the machine. In the operation of the machine the chart is drawn off of one roller and wrapped upon a take-up roller, and as the coils or wraps of the fabric increase upon the take-up roller the virtual diameter of the take-up roller constantly increases.

The general object of my invention is to provide simple means for regulating or adjusting the chart at the take-up roller so that as it wraps upon the take-up roller correct indication of the machine will be assured, that is to say, that when the measuring roller has actually measured a certain length of fabric, the number corresponding to this length will then appear at the reading point of the machine with its corresponding column or row of computed figures.

While the invention is capable of application in measuring machines for any purpose which employ a chart for carrying measurements or computations, it is expected to be especially useful when applied to fabric measuring and cost computing machines.

The chart consists of a long strip of paper, cloth, or the like, upon which are marked, at successively slightly increasing distances apart, marks corresponding to measurements, as, for example, the scale may thus be divided into subdivisions corresponding to eighths of a yard or other units. The slightly increasing distances apart of the subdivisions on the scale is designed to take care of increased effective roll diameter, as the chart is rolled up.

Adjacent to the measurement subdivisions are preferably arranged figures in dollars and cents for price computation, and showing the price of the measured lengths of goods at certain prices per yard.

The chart is preferably actuated for measurement and price computation by the roller on which it is mounted. This roller is rotated by lengthwise movement of the goods to be measured, making always the same number of turns for the same length of goods.

The chart is provided with a shim adapted to be wrapped between the layers of the chart as it wraps upon its roll, and the dimensions of the shim may be suitably altered, as by cutting off parts thereof, until the chart is fitted to its particular actuating roller, and adapted to serve to give substantially accurate measurements.

The chart and roller are so constructed that the chart may be readily attached to and detached from the roller, and when attached is securely fastened in place with a definite and fixed relation to the roller, so that it cannot slip or turn relative to the roller to change its position with respect thereto, which is important for a chart to be used as a measuring device.

An embodiment of the invention is illustrated in the accompanying drawing, but it is to be understood that same is for affording an understanding of my invention only and not for limitation of the invention.

In said drawing, Fig. 1 is an isometric view, with parts broken away, of a chart and shim, in accordance with my invention. Fig. 2 is a similar view of the chart and roller, partly assembled together. Fig. 3 is a longitudinal cross-sectional view of the roller with the removable head in place thereon. Fig. 4 is an isometric view of the chart and shim partly wound on the roller, and partly on a take up roll. Fig. 5 is a cross-sectional view on line 5—5, Fig. 3.

Figure 6:
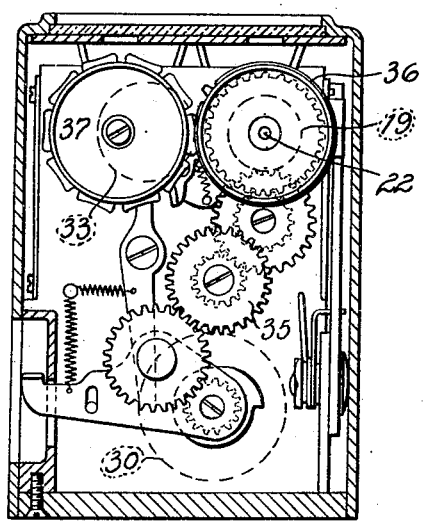
Figure 6 is a vertical cross section through a machine embodying my invention and particularly illustrating the driving mechanism.

The chart 10 is provided with the subdivisions as 11, 12, etc., here shown as corresponding to eighths of a yard, and adjacent thereto are the figures as illustrated at 13 giving cost of the measured lengths at certain prices per yard, the per yard prices (not shown) being indicated on a window of the metering machine through which the chart is observed.

The chart 10 has a loop 14 formed thereon, as by stitching, cementing, or the like along the line 15, whereby the turned back material of the chart is secured together at separated regions forming the loop 14 therebetween. Other modes of forming a loop may be resorted to.

The material of the chart has a part beyond loop 14 to form an extension 16, which may serve as a shim in adjusting the particular chart to the particular roll to give the best results in measurement of goods.

The shim 16 is shown in cross section in Fig. 4. If it is too long, it may be cut off one or more times to get accurate measurement results. For example, if when cut off at 17, Fig. 4, it should still be too long, it can again be cut off at 18 and so on, until accurate results are obtained.

The take-up roll for chart 10 is designated generally by reference numeral 19. It comprises a tube 20, preferably of metal, having a slot 21 for the passage of the doubled over part of the chart. Said slot is open at the outer end of the tube 20. The roll also has a central shaft 22 which is permanently connected to tube 20 at one end thereof, by the flanged head 23. The other end of tube 20 is open and is adapted to be closed by the removable head 24, which has a bore 24' to fit over shaft 22 and is provided with a roll flange 25 and has a groove 26. The tube 20 is indented at 27, the indented portion 27 being adapted to spring into groove 26 and so releasably hold head 24 in place. A supply drum or roller 28 is provided which carries a chart 10 when the machine is not in active use. When the machine is being used to measure, the motion from a measuring roller (not illustrated) is imparted to the roll 19 so that the roll 19 is rotated proportionately to the amount of fabric. In this way the roll 19 operates as a take-up roller to wind up the chart and bring the figures 13 past the reading point of the machine. The roller 28 is preferably provided with a spring 29 which operates to keep the chart 10 taut as it is drawn off from the roller 28 and also operates to return the chart to the roller 28 after the measuring operation has been completed.

When placing the chart on its roll, the head 24 is removed and the folded part of the chart inserted into the open ended slot 21 with the chart and shim projecting outside of the tube 20, and the loop 14 encircling the shaft 22. After the chart is in place the head 24 is put on, completing the assembly. This provides a simple mode of assembly and take down. When the parts are assembled together and the chart wound on the roll, with such part of the shim as needed therein, the chart is firmly and positively connected to the roll and occupies a fixed and definite relation thereto and is well adapted for use in metering goods.

Figure 7:
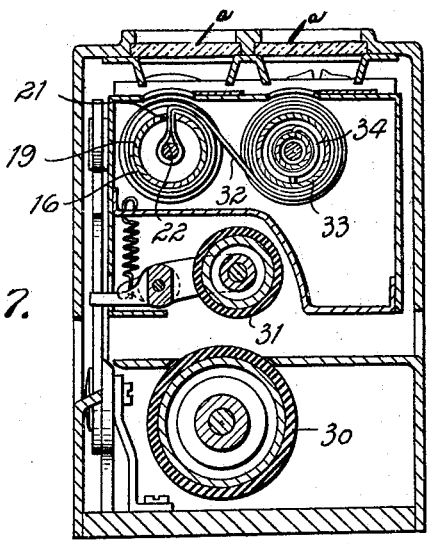
Figure 7 is also a vertical cross section through the machine but looking in the opposition direction and particularly illustrating the parts of my invention as applied to a machine of this type.

In Figures 6 and 7 I illustrate the application of the invention to a measuring machine of a well-known type in which the fabric to be measured is pulled through the machine between a measuring roller 30 and a presser roller 31. A chart 32 is mounted on a take-up roller 19 to which the chart 32 is secured by passing it through the longitudinal slot 21 in the roller shaft, the said chart forming a loop around the shaft 22, and having an end portion or shim extending over and adapted to wind on the face of the roller under the chart 32 and between the layers of the chart. It will be evident that the length of this shim or end portion 16 will operate to affect the virtual diameter of the roll 19, that is to say, the longer this shim is the greater would be the virtual diameter of this roller. The body of the chart is normally held wrapped upon the roller 33 which corresponds with roller 28 already described, and carrying a spring 34 within it which maintains the chart 32 in tension and also effects the return of the instrument to zero after a measuring movement.

The shaft 22 is driven from the measuring roller 30 by a suitable gear train 35. (See Figure 6.) In the instrument illustrated the shaft 22 carries a counter-wheel 36 to indicate yard-fractions and this wheel makes one complete revolution while the machine is measuring one yard. At the completion of each revolution of the fraction wheel 36 it advances a counter-wheel 37 through one number space so that the wheel 37 indicates the total integer of the measurement while the wheel 36 merely indicates the fraction.

With a machine of this kind it is evident that the computed figures indicated at 13, which correspond to different measured lengths of fabric, must appear at the reading point or windows a—a of the machine (see Fig. 7) when the machine has measured the exact amount indicated. In other words, there must be a perfect correspondence in the amount actually measured by the measuring roller and the indicated length measurements and computations which appear at the reading point. According to my invention it will be evident that by making the shim of a predetermined length the chart can be adjusted or regulated with respect to the length measured by the measuring roller so that the machine will accurately indicate the measurements and charges to be made for the length measured.

It is to be understood that modifications and changes may be resorted to within the scope of my claims without departing from or sacrificing the advantages of my invention.

I claim:

1. In a fabric measuring and cost computing machine, the combination of a casing having a reading point, a measuring roller, a take-up roller driven by the measuring roller and having a chart with rows of computed figures attached thereto, and a shim wrapped between the roller and the chart, the shim being of a predetermined length operating to bring the rows of computed figures into alignment with the reading point to correspond with the length actually measured by the measuring roller.

2. In a fabric measuring and cost computing machine, the combination of a casing having a sight opening, a measuring roller, a take-up roller driven by the measuring roller and having a chart with rows of computed figures, attached thereto, and a shim wrapped between the layers of the chart, the shim being of a predetermined length operating to bring the rows of computed figures into alignment with the sight opening to correspond with the length actually measured by the measuring roller.

3. In a fabric measuring machine, the combination of a chart consisting of an elongated strip bearing measurement indications, a tubular roller having a longitudinal slot through the wall thereof, a central shaft for the roller projecting at the ends thereof to support the same, said chart having a loop disposed around the central shaft and having an extension unattached to the face of the chart and operating to lie between the layers of the chart when the same is wrapped on the roller, said extension constructed to have the edge thereof detached to enable the length of the same to be adjusted, the length of the extension operating to regulate the diameter of the wrapped roller.

4. In a machine of the kind described, the combination of a tubular roll having a slot extending to the end thereof, a chart bearing measurement indications passing through said slot, means within the roll co-operating with the chart to enable the chart to be disposed in a loop within the roll, said chart having an end portion passing out through the slot and adapted to wrap around the roll and thereby affect the virtual diameter thereof.

In testimony that I claim the foregoing, I hereto set my hand, this 22nd day of December, 1919.

JOHANNES T. PEDERSEN.